United States Patent [19]
Olstad et al.

[11] Patent Number: 5,764,850
[45] Date of Patent: Jun. 9, 1998

[54] SILICON CARBIDE FOAM ELECTRIC HEATER FOR HEATING GAS DIRECTED THERETHROUGH

[75] Inventors: Stuart J. Olstad, Maple Grove; Kevin T. Uznanski, Plymouth, both of Minn.

[73] Assignee: Phoenix Solutions Co., Minneapolis, Minn.

[21] Appl. No.: 626,151

[22] Filed: Apr. 4, 1996

[51] Int. Cl.⁶ .................................. H05B 1/00; F24H 3/04
[52] U.S. Cl. ........................... 392/485; 219/544; 219/552; 29/611
[58] Field of Search ......................... 392/485, 488, 392/490; 219/552, 553, 505, 544, 546, 549; 55/DIG. 30; 60/300, 302; 422/174; 29/611

[56] References Cited

U.S. PATENT DOCUMENTS

| | | | |
|---|---|---|---|
| 3,459,924 | 8/1969 | McMichael | 392/488 |
| 3,691,346 | 9/1972 | Dyre et al. | 392/485 |
| 3,828,161 | 8/1974 | Yamaguchi | 392/485 |
| 4,813,231 | 3/1989 | Bykowski | 55/DIG. 30 |
| 4,917,968 | 4/1990 | Tuffias et al. | |
| 5,117,482 | 5/1992 | Hauber | 392/492 |
| 5,154,970 | 10/1992 | Kaplan et al. | |
| 5,282,861 | 2/1994 | Kaplan | |
| 5,283,109 | 2/1994 | Kaplan et al. | |
| 5,372,380 | 12/1994 | Duffy et al. | |

FOREIGN PATENT DOCUMENTS 7-286512  10/1995  Japan.
678020  7/1991  Switzerland.

OTHER PUBLICATIONS

Brochure entitled "Heaters"; Phoenix Solutions Co.
Brochure entitled "Duocel Ceramic Foam"; Energy Research & Generation Inc.

*Primary Examiner*—John A. Jeffery
*Attorney, Agent, or Firm*—Palmatier, Sjoquist, Voigt & Christensen,P.A.

[57] ABSTRACT

An electrical foam heating element made by the process of forming a volume of reticulated silicon carbide foam material into a preferred shape, heating the material to a temperature of about 1000° C. for a period of 24–30 hours, forming conductive edges over two respectively facing edge surfaces, applying an electrically-conductive felt material against the respective conductive faces, and clamping foam volume and foam between two electrically-conductive electrodes. In another embodiment, a region of nickel foam material is provided between the respective electrodes and the silicon carbide interior, and intermediate felt layers are provided between the nickel foam and the silicon carbide foam, and between the nickel foam and the electrodes. The layered felt material is of three-layer construction: inner and outer layers of electrically-conductive felt separated by an interior metal foil layer.

11 Claims, 3 Drawing Sheets

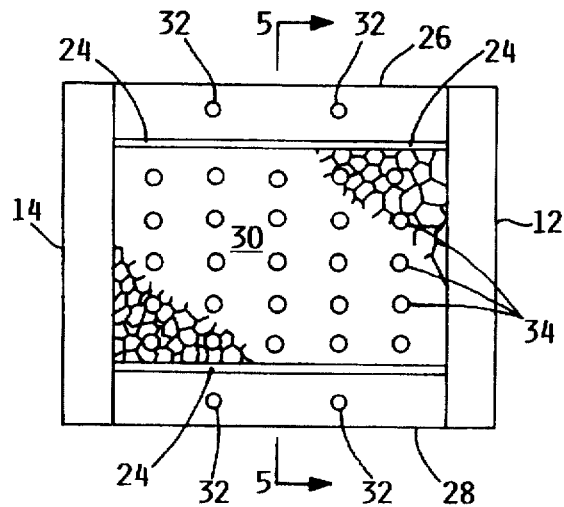 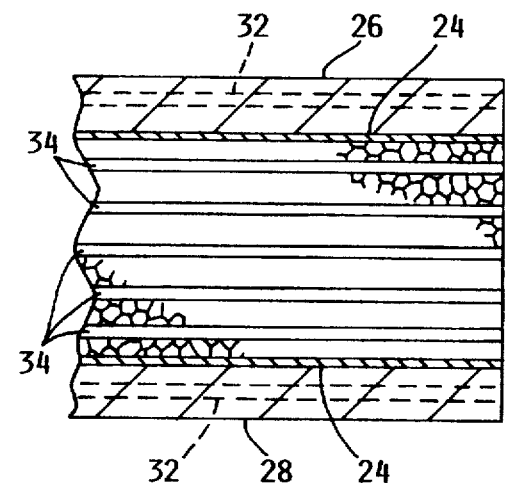
FIG. 4   FIG. 5
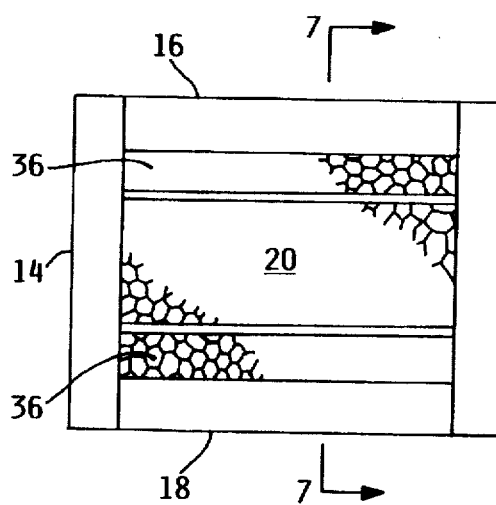 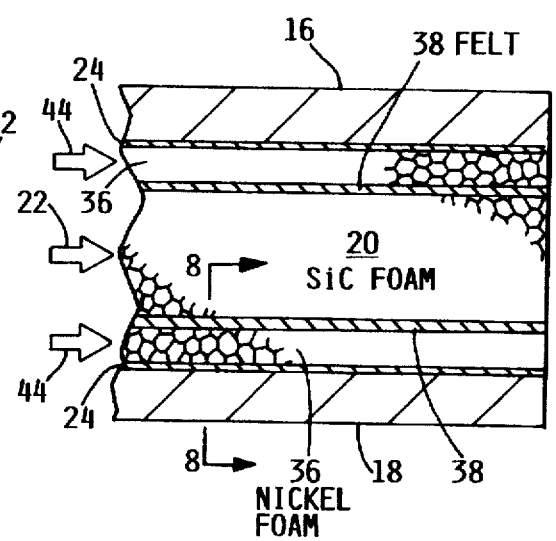
FIG. 6   FIG. 7

SILICON CARBIDE FOAM ELECTRIC HEATER FOR HEATING GAS DIRECTED THERETHROUGH

BACKGROUND OF THE INVENTION

The present invention relates to high-temperature heaters for heating and conveying gases. More particularly, the invention relates to a method for making a high-temperature heating element and the heating element construction resulting therefrom.

Heaters of the general type described in this application find utility in a wide variety of applications. For example, they are sometimes used downstream of a combustion furnace wherein the furnace is used for burning pollutants of various types. Federal regulations frequently require that the gas byproducts from a pollution-burning furnace must be held at an elevated temperature for a predetermined length of time in order to ensure that the necessary chemical reactions have been completed. In such cases, a product such as that described herein may be used on the downstream end of a furnace to convey the burned or partially-burned gases away from the furnace and into some form of chamber where the gases may be continually held at an elevated temperature to ensure that the burning process and chemical transitions have occurred.

The present invention may also be used as a preheater for conveying gases to a burning chamber or test chamber wherein the gases are elevated in temperature while they are conveyed. For example, methane gas may be preheated by the present device while it is being conveyed to a combuster to improve the efficiency of the combustion process. Other and further applications for devices of the present type are readily known and available.

Prior art heaters of this general type have been made in the form of electrically-conductive screen elements which traverse the gas flow path, wherein the screen elements are heated by electrical currents passing through the screens, and the gas which passes through the heated screens becomes heated. Screens made from tungsten, Nichrome and other metals have been used for this purpose, wherein the screens are confined between voltage electrodes and a relatively high current is passed through the screens. Heaters of this general type are capable of elevating gas temperatures to the range of 1,200° F.–2,000° F., at high mass flow rates, and are considered to be very compact in size. It is not unusual for such devices to draw very high amperage; i.e., several thousand amps, in order to produce the required heating power.

One problem with using screens as the heating element in heaters of this general type is the limited service temperature of the alloy material. Another problem is that the gases which flow through heaters of this type typically include corrosive and/or oxidizing components, and these components tend to reduce the useful life of the heater element.

It would be an advantage to provide the equivalent or higher heating capabilities at lower amperage and also to increase the temperature of the heated gas. It would be a further advantage to utilize a heating element having a higher corrosion and oxidation resistance. The present invention is able to achieve these advantages as will be described herein.

SUMMARY OF THE INVENTION

The invention comprises a product made by a process, the process involving changing the composition of a silicon carbide (SiC) foam material which is commonly available in the industry, and adapting the foam material to a particular heater construction. Commercially-available reticulated SiC foam is fabricated by a chemical vapor deposition process, wherein the SiC is layered on an interior skeleton of reticulated vitreous carbon. The carbon skeleton remains within the material after the vapor deposition process has been completed. The present invention utilizes a step in which the silicon carbide foam is initially heated at an elevated temperature of about 1,000° C. to diffuse the carbon skeleton from the foam and also to provide a fused silica layer to the outside surface of the foam ligaments. Two opposing edge surfaces of the silicon carbide foam are treated to remove the fused silica at the exposed edge points, and the silicon carbide foam is then inserted between two conductive electrodes. An electrically-conductive felt strip is placed between the edge surfaces of the foam material and the electrodes to improve electrical conductivity between the surfaces.

The product made by the foregoing process may then be adapted into various physical forms depending upon the particular application for the heater device. Included in these forms are various types of bypass openings which may be made through the foam to control the rate of fouling in particulate-laden flows.

It is an object of the present invention to provide a gas heater wherein the heating elements have an extended life capability and are capable of being driven to higher temperatures under relatively lower amperage draw than the prior art.

It is another object of the present invention to utilize silicon carbide foam as the heating element in a gas heating system.

Other and further objects and advantages will become apparent from the following specification and claims and with reference to the appended drawings.

BRIEF DESCRIPTION OF THE DRAWINGS

FIG. 4 shows an alternate form of the invention using cooling passages;

FIG. 5 shows a view taken along lines 5—5 of FIG. 4;

FIG. 6 shows a further alternate arrangement of the invention;

FIG. 7 shows a view taken along lines 7—7 of FIG. 6; and

DESCRIPTION OF THE PREFERRED EMBODIMENT

Figure 1:
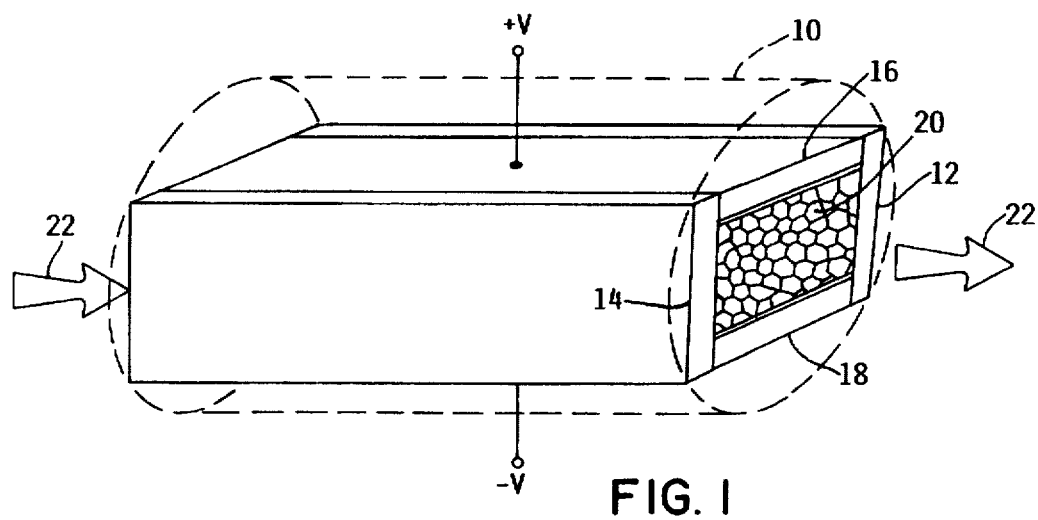
FIG. 1 shows a perspective view of one form of the invention.

Referring first to FIG. 1, the invention is shown in perspective view in one form. Insulation layers 12 and 14 are provided on each side of a volume 20 filled with silicon carbide foam. Electrodes 16 and 18 are placed above and below the silicon carbide foam volume 20 such that electrical contact is made between the foam and each electrode. Electrode 16 may be made from nickel or a similar electrically-conductive material and is connected to a source of voltage +V. Electrode 18 may be made from a similar conductive material and is connected to a source of voltage −V. The voltage source in typical industrial applications will be 120/240/VAC, single or multiple phase.

For example, if a three-phase voltage source were used, the embodiment of any of the figures would serve as a heating element for each phase. The heating element of FIG. 1, for example, would be aligned with two additional heating elements, with each heating element connected to a different voltage phase. Current flow will pass through the electrodes and through the silicon carbide foam material 20 and, due to the resistance of the foam material, will cause the foam material to heat. The foam material 20 is very porous, typically from 60% to 90% porous; and therefore, gas may flow through the material very easily. However, the gas flowing through the porous material will absorb heat from the silicon carbide ligaments throughout the material.

The silicon carbide foam 20 is a reticulated silicon carbide material which is available commercially from a number of manufacturers. For example, the material is sold by Energy Research and Generation, Inc. of Oakland, Calif., under the registered trademark "DUOCEL®" as a ceramic foam material. It is also available from Ultramet, Pacoima, Calif. It is characterized by its open cell construction, having a silicon carbide fiber-reinforced structure produced by chemical vapor deposition. The structure has thin ligaments with no closed cells, which provides a large heat transfer surface area with a minimum pressure drop. The material has a high crush strength and a relatively high electrical resistivity at elevated temperatures; the material is capable of continuous use at temperatures up to 2,200° C.

Since carbon has a significantly lower electrical resistivity than SiC, the bulk resistivity of the as received material is unstable and undesirably low. To diffuse the carbon skeleton from the foam, the material is heated to a temperature of approximately 1000° C. for a period of 24–30 hours, which has the favorable effect of increasing and stabilizing the electrical resistance of the bulk material. During this heating, a protective layer of fused silica ($SiO_2$) is also formed on the exterior of the SiC ligaments, giving the foam a high resistance to oxidation and corrosives.

The silicon carbide material purchased commercially is first treated according to the following process steps, in order to prepare it for use as a part of the present invention:

1) The silicon carbide material is heated at a temperature of about 1,000° C. for a time period of 24–30 hours;
2) Two edge surfaces of the material are exposed by either a grinding process or an etching process;
3) The exposed edge surfaces are plated with a suitable metal, such as silver;
4) The conductive ends of the material are fitted to a electrically-conductive felt material; and
5) The material and the respective electrically-conductive felt pads on the electrically-conductive faces are installed between two electrodes of high electrical conductivity.

The step which renders the edge surfaces of the silicon carbide material conductive can be accomplished by a grinding process against the respective edge surfaces, which grinds away the fused silicon which is formed during the heating step, thereby exposing the silicon carbide to the edge surfaces. Alternatively, the edge surfaces can be ion sputtered or otherwise plated on the conductive edge surfaces with a conductive material to prevent the formation of $SiO_2$ during the life of the element.

The temperature heating step serves primarily to bake out the internal carbon skeleton and to form the protective $SiO_2$ outer skin over the individual ligaments.

With the material processed in the manner as described above, it can then be installed into a gas conveying system which is illustrated in FIG. 1 in one of the simplest forms and a quantity of gas can be passed through the materials as indicated by the arrows 22. The voltage across the respective electrodes is typically adjusted so as to provide a current through the device in the range of 400–500 amps, although a much wider range of currents can be used with the material.

Figure 2:
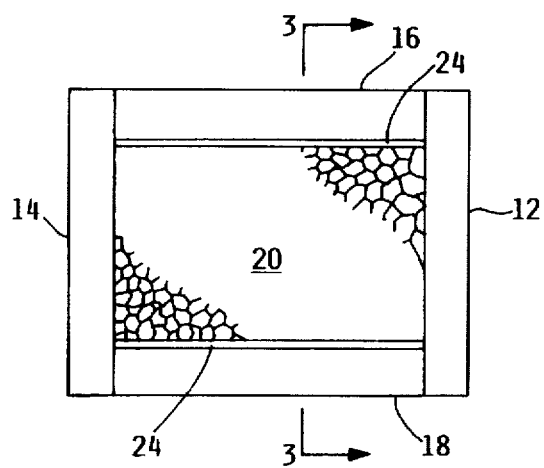
FIG. 2 shows an end view of the invention of FIG. 1.
Figure 3:
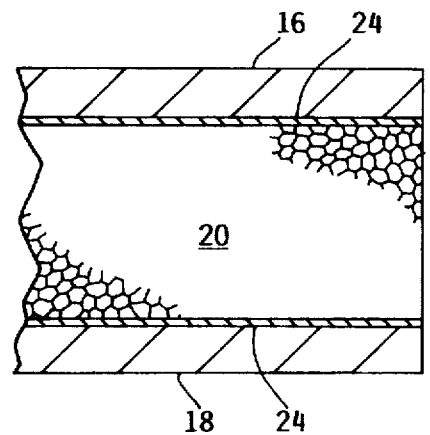
FIG. 3 shows a view taken along lines 3—3 of FIG. 2.

FIG. 2 shows an end view of the structure of FIG. 1, wherein the electrically-conductive felt layers 24 can be better observed between the respective electrodes 16, 18 and the silicon carbide foam material 20. FIG. 3 illustrates a view taken along the lines 3—3 of FIG. 2, further illustrating the layered construction of the apparatus.

FIGS. 4 and 5 illustrate a further embodiment of the invention, wherein cooling passages 32 are provided for particular applications. The respective upper and lower electrodes 26, 28 may have at least one through passage 32 drilled along the respective length and a cooling medium may be passed through the passages 32 to control the electrode temperature. Similarly, the silicon carbide foam material 30 may have one or a plurality of interior elongate passages 34 passing therethrough in order to inhibit fouling of the element in a particle-laden gas flow. FIG. 4 is an end view of the modified apparatus, and FIG. 5 is a cross-sectional view taken along the lines 5—5 of FIG. 4.

Figure 8:
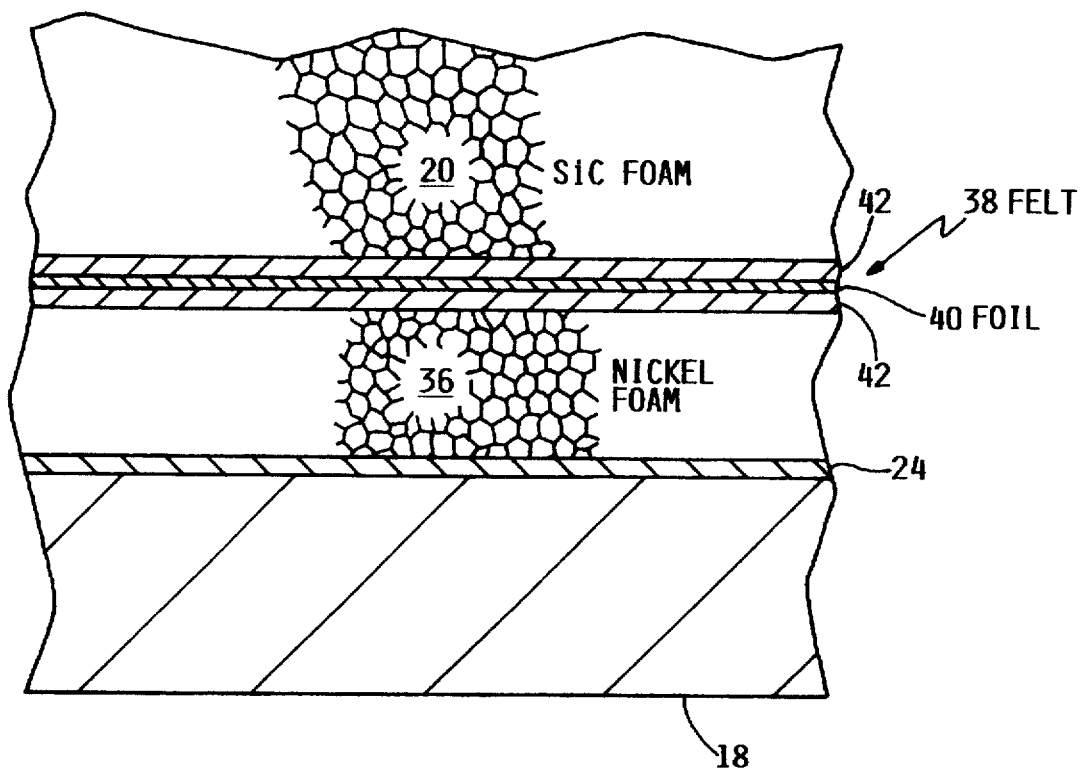
FIG. 8 shows a view taken along lines 8—8 of FIG. 7.

FIGS. 6 and 7 show a further alternative construction, wherein a different form of cooling is provided. In this case, a region of nickel foam material 36 is provided between the respective electrodes 16, 18 and the silicon carbide interior 20. Intermediate felt layers 38 are provided between the nickel foam and the silicon carbide foam, and between the nickel foam and the electrodes 16. FIG. 8 shows an exploded and cross-sectional view of a portion of the material as represented by the sections defined by the lines 8—8 of FIG. 7. The metal felt material 38 is of three-layer construction; inner and outer layers of electrically-conductive felt 42 are separated by an interior metal foil layer 40. This three-layered construction is then placed between the nickel foam 36 and the silicon carbide foam 20. The nickel foam 36 is useful because of its open cell construction, thereby permitting a relatively free flow of gas through the elongate path of the system. As the gas flow stream 22 enters the layered nickel/SiC heater element, part of the gas flow 44 bypasses the SiC foam 20 and is routed through the nickel foam 36. This flow 44 becomes a bypass flow and is cooler than the main gas flow stream 22 that flows through the foam material 22. The cooler bypass flow serves to actively cool the electrodes 16, the nickel foam 36, and the intermediate felts and foils 38, thereby eliminating the need for cooling the electrodes 16, 18 with an external coolant. The bypass flow 44 is mixed with the hotter main flow 22 downstream of the heater element to produce the desired temperature of the process stream. The three-layer construction of the metal felt 38 provides good electrical conductivity between the nickel foam and the silicon carbide foam, and also provides a flow barrier, by virtue of the metal foil 40, between the nickel foam 36 and the silicon carbide foam 20. Therefore, the hot gases from foam 20 will not infiltrate foam 36, thus minimizing the temperature rise of bypass flow 44. This cooling effect will serve to advantageously cool the electrodes 16, 18 and felt layers 24, 38 without significantly cooling the interior silicon carbide foam material 20. Under these circumstances, the gases flowing through the silicon carbide foam material will remain heated to an elevated temperature, while the electrodes will stay relatively cool.

In operation, the silicon carbide foam material is first processed according to the steps described herein, and after its respective top and bottom edge surfaces have been made electrically conductive, it is inserted into the layered construction shown in the appended drawings. A clamping force may be applied against the respective top and bottom electrodes in order to assure good electrical contact, and the entire assembly may be placed into a housing such as the housing 10 illustrated in FIG. 1. The respective electrodes are connected to a suitable source of voltage in order to develop the heating current which passes through the electrodes, the intervening layers, and the silicon carbide foam material. The current passing through the silicon carbide foam material causes the material to heat to an elevated temperature. As gases are passed through the elongate construction so formed, the gases will become heated to a similar elevated temperature for conveyance in any suitable application.

Other and further alternatives may be constructed within the spirit of the invention. For example, the elongate passages shown in FIGS. 4 and 5 may be constructed so as to pass only partially through the silicon carbide foam material. This has the net effect of providing an extended useful life for the silicon carbide foam in particulate-laden flows, for the particulates would otherwise collect against the surface facing upstream toward the gas flow, and the gas flow would relatively quickly become restricted by the accumulation of dirt and particles on the surface.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An electric heater for heating gases passing through a volumetric shape of silicon carbide foam material, comprising:
    a) an elongate volumetric shape of silicon carbide foam material arranged along an axis, said foam material being constructed of reticulated silicon carbide, and having respective electrically-conductive opposing edge surfaces;
    b) an elongate layer of electrically conductive felt placed adjacent each of said electrically-conductive opposing edge surfaces;
    c) an elongate conductive electrode positioned against the outer surface of each of said elongate sheets of electrically conductive felt;
    d) a source of voltage applied across said respective electrodes; and
    e) means for applying a flow of gas through said volumetric shape of silicon carbide foam material, in a direction coinciding with said axis,
    wherein the gas is heated by said silicon carbide foam material as the gas flows through said silicon carbide foam material along said axis.

2. The apparatus of claim 1, further comprising a plurality of elongate passages through said volumetric shape of silicon carbide foam material, parallel to said axis.

3. The apparatus of claim 1, further comprising a plurality of elongate passages through said electrodes.

4. The apparatus of claim 1, further comprising a layer of nickel foam material placed intermediate each of said electrodes and said respective conductive felt sheets.

5. The apparatus of claim 4, wherein said elongate sheet of conductive felt further comprises a pair of outer layers of metal felt and an inner layer of metal foil, whereby gas cannot permeate said metal foil.

6. A foam heating element product made by a process comprising the steps of:
    a) forming a silicon carbide foam material into a suitable volumetric shape;
    b) heating the volumetric shape of silicon carbide foam material at a temperature of about 1000° C. for a time period of from 24 to 30 hours;
    c) forming an electrically conductive face over two opposing edge surfaces of said volumetric shape;
    d) applying an electrically conductive felt material over the respective edge surfaces for which the conductive faces have been formed; and
    e) compressing the volumetric shape with the applied conductive felt material between two conductive voltage electrodes.

7. The product by process of claim 6, wherein the step of forming a conductive face further comprises grinding away a portion of the respective edge surfaces of said volumetric shape of silicon carbide foam material.

8. The product by process of claim 7, wherein the step of forming a conductive face further comprises plating the respective ground-away edge surfaces with a conductive layer.

9. The product by process of claim 6, further comprising the steps of boring elongate passages through said volumetric shape of silicon carbide foam material.

10. The product by process of claim 6, further comprising the steps of boring elongate passages through said conductive voltage electrodes.

11. The product by process of claim 6, further comprising the steps of boring elongate passages at least partially through said volumetric shape of silicon carbide material.

* * * * *